US009807114B2

(12) United States Patent
Kolton et al.

(10) Patent No.: US 9,807,114 B2
(45) Date of Patent: *Oct. 31, 2017

(54) SYSTEM AND A METHOD FOR IDENTIFYING THE PRESENCE OF MALWARE USING MINI-TRAPS SET AT NETWORK ENDPOINTS

(71) Applicant: TopSpin Security LTD., Herzelia (IL)

(72) Inventors: Doron Kolton, Pardesia (IL); Rami Mizrahi, Herzelia (IL); Omer Zohar, Rishon-LeZion (IL); Benny Ben-Rabi, Beit-Shemesh (IL); Alex Barbalat, Rishon-LeZion (IL); Shlomi Gabai, Rishon-LeZion (IL)

(73) Assignee: TOPSPIN SECURTIY LTD, Herzelia (IL)

(*) Notice: Subject to any disclaimer, the term of this patent is extended or adjusted under 35 U.S.C. 154(b) by 0 days.

This patent is subject to a terminal disclaimer.

(21) Appl. No.: 14/844,844

(22) Filed: Sep. 3, 2015

(65) Prior Publication Data
US 2016/0072838 A1     Mar. 10, 2016

Related U.S. Application Data

(60) Provisional application No. 62/046,319, filed on Sep. 5, 2014.

(51) Int. Cl.
*G06F 12/14*     (2006.01)
*H04L 29/06*     (2006.01)

(52) U.S. Cl.
CPC ........ *H04L 63/1491* (2013.01); *H04L 63/145* (2013.01)

(58) Field of Classification Search
None
See application file for complete search history.

(56) References Cited

U.S. PATENT DOCUMENTS

| | | | |
|---|---|---|---|
| 2004/0128543 A1* | 7/2004 | Blake | H04L 63/0227 726/25 |
| 2009/0328216 A1* | 12/2009 | Rafalovich | H04L 43/0876 726/23 |
| 2010/0077483 A1* | 3/2010 | Stolfo | G06F 21/554 726/24 |

* cited by examiner

*Primary Examiner* — Fatoumata Traore
(74) *Attorney, Agent, or Firm* — Michael J. Feigin, Esq.; Feigin & Fridman

(57) ABSTRACT

A system for identifying the presence of advanced persistent threats on a network including a plurality of resources, interconnected to form a network, at least one decoy resource, at least one mini-trap installed on at least one of the plurality of resources and functionally associated with one of the at least one decoy resource, the at least one mini-trap comprising deceptive information directing malware accessing the at least one mini-trap to the decoy resource associated therewith, and a manager node forming part of the network, locally or remotely, and configured to manage placement of the at least one mini-trap on the at least one of the plurality of resources and association between the at least one mini-trap and the decoy resource associated therewith.

12 Claims, 2 Drawing Sheets

SYSTEM AND A METHOD FOR IDENTIFYING THE PRESENCE OF MALWARE USING MINI-TRAPS SET AT NETWORK ENDPOINTS

RELATED APPLICATION

The present application gains priority from U.S. Provisional Patent Application No. 62/046,319 filed Sep. 5, 2014 and entitled A METHOD FOR IDENTIFYING THE PRESENCE OF MALWARE BY SETTING MINI-TRAPS IN NETWORK ENDPOINTS, which is incorporated herein by reference as if fully set forth herein.

FIELD AND BACKGROUND OF THE INVENTION

The invention, in some embodiments, relates to the field of computer threats, and more specifically to methods and systems for identifying the presence of advanced persistent threats in a network and for trapping the threats.

Advanced persistent threats, such as computer viruses, computer worms, Trojan horses, and other malware, particularly when infecting endpoints in an organization's network, are some of the most crucial security problems for many organizations. Current security mechanisms are generally unable to cope with, and to prevent, infectious attacks, and as a result attackers, such as hackers, crackers, and cyber-terrorists, are able to insert malware into the networks of such organizations. Once malware is present on an organization's network, the malware communicates with its controllers, such as hackers, crackers and cyber-terrorists, via command and control (C&C) mechanisms, which direct the malware as to what data to obtain, where to find such data, and where to send the data once it is obtained.

One method currently used for identifying the presence of malware on a network involves signature matching or pattern matching of malware families. For this method to properly identify the presence of malware, the malware must first be caught and analyzed to derive one or more relevant signatures, which signatures are then used to prevent a malware infection by such malware in other computers in the network or in other networks. However, malware signatures are changed, added and mutated constantly, and signature analysis tools typically cannot keep up with the changing malware signatures, and therefore this method is far from failsafe.

In other methods, machine learning, behavioral analysis, and classification algorithms are used to find packets within the network traffic which include communication between malware within the network and the command and control mechanism controlling the malware, or other suspicious activities in the network. However, this method requires collecting all the traffic to and from the organization, collecting data from assets inside the organization and the computational analysis methods used to implement this technique often trigger false positives and/or suffer from false negatives.

Yet another method, known as "sandboxing", involves running suspicious code in a secluded emulation environment, also called a sandbox, in order to identify the purpose of the code without the code being able to access the real resources of the organization. For example, a sandbox may be implemented by installing a proxy at the gateway to a network, and executing all HTTP pages within the proxy prior to forwarding them to the requesting node or computer within the network. However, sandboxing often greatly slows down the flow of traffic in the network, due to the need to check every incoming piece of suspicious code. Additionally, malware developers have found multiple different methods for circumventing or bypassing sandboxing technologies, thereby reducing the effectiveness of this technology.

There is thus a need for a technology which identifies the presence of attacking malware within the network following infection of the network, and which is able to trap the malware within the network so as to prevent excessive damage to network resources.

SUMMARY OF THE INVENTION

The invention, in some embodiments, relates to the field of computer threats, and more specifically to methods and systems for identifying the presence of advanced persistent threats in a network and for trapping the threats.

According to an aspect of some embodiments of the invention there is provided a system for identifying the presence of advanced persistent threats on a network, including a plurality of resources, interconnected to form a network, at least one decoy resource, at least one mini-trap installed on at least one of the plurality of resources and functionally associated with at one of the at least one decoy resource, the at least one mini-trap including deceptive information directing malware accessing the at least one mini-trap to the decoy resource associated therewith, and a manager node forming part of the network and configured to manage placement of the at least one mini-trap on the at least one of the plurality of resources and association between the at least one mini-trap and the decoy resource associated therewith.

In some embodiments, the decoy resource forms part of the network. In some embodiments, the deceptive information includes faked credentials.

In some embodiments, the at least one mini-trap includes a plurality of mini traps, the at least one decoy resource includes a plurality of decoy resources, and wherein at least two of the plurality of mini-traps are associated with different ones of the plurality of decoy resources.

In some embodiments, the at least one mini-trap includes a plurality of mini traps, and wherein at least two of the plurality of mini-traps are associated with the same one of the at least one decoy resource.

In some embodiments, each of the at least one mini-trap is associated with a unique value, such that when infecting malware accesses one of the at least one mini-trap located on a specific one of the plurality of resources, the mini-trap being accessed is uniquely identified, thereby uniquely identifying the specific resource as being infected.

In some embodiments, the manager node includes a user interface, allowing a user to configure the network, set up one or more of the at least one mini-trap and of the at least one decoy resource, and gather information from the at least one decoy resource.

In some embodiments, the network includes at least two Local Area Networks (LANs), the at least one mini-trap is installed on a resource in a first of the at least two LANs, and the at least one decoy resource associated with the at least one mini-trap is on a second of the at least two LANs. In some such embodiments, the at least two LANs are geographically distributed.

In some embodiments, the system further includes at least one traffic sniffer functionally associated with the at least one mini-trap, configured to sniff use of the at least one mini-trap and thereby to indicate the presence of infecting malware.

According to another aspect of some embodiments of the invention there is provided a method for identifying the presence of advanced persistent threats on a network including a plurality of resources, the method including providing at least one decoy resource, installing at least one mini-trap on at least one of the plurality of resources, the at least one mini-trap including deceptive information directing malware accessing the at least one mini-trap to a specific one of the at least one decoy resource associated therewith, and detecting use of the at least one mini-trap by infecting malware, thereby to identify the presence of malware on the at least one of the plurality of resources where the at least one mini-trap is installed.

In some embodiments, the method further includes associating each of the at least one mini-trap with a unique value, and wherein the detecting includes detecting the unique value associated with the mini-trap accessed by malware.

In some embodiments, the detecting includes sniffing use of the at least one mini-trap in traffic in the network.

In some embodiments, the installing includes at least one of the following:

planting the at least one mini-trap on the one of the plurality of resources using Active Directory GPO tools;

planting the at least one mini-trap on the one of the plurality of resources using administrator credentials and authorizations;

directly accessing the one of the plurality of resources to plant the at least one mini-trap thereon; and running agents on the plurality of resources for planting the at least one mini-trap thereon.

In some embodiments, the method further includes periodically updating the functional association between the at least one mini-trap and the at least one decoy resource.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or monitors. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results).

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1:
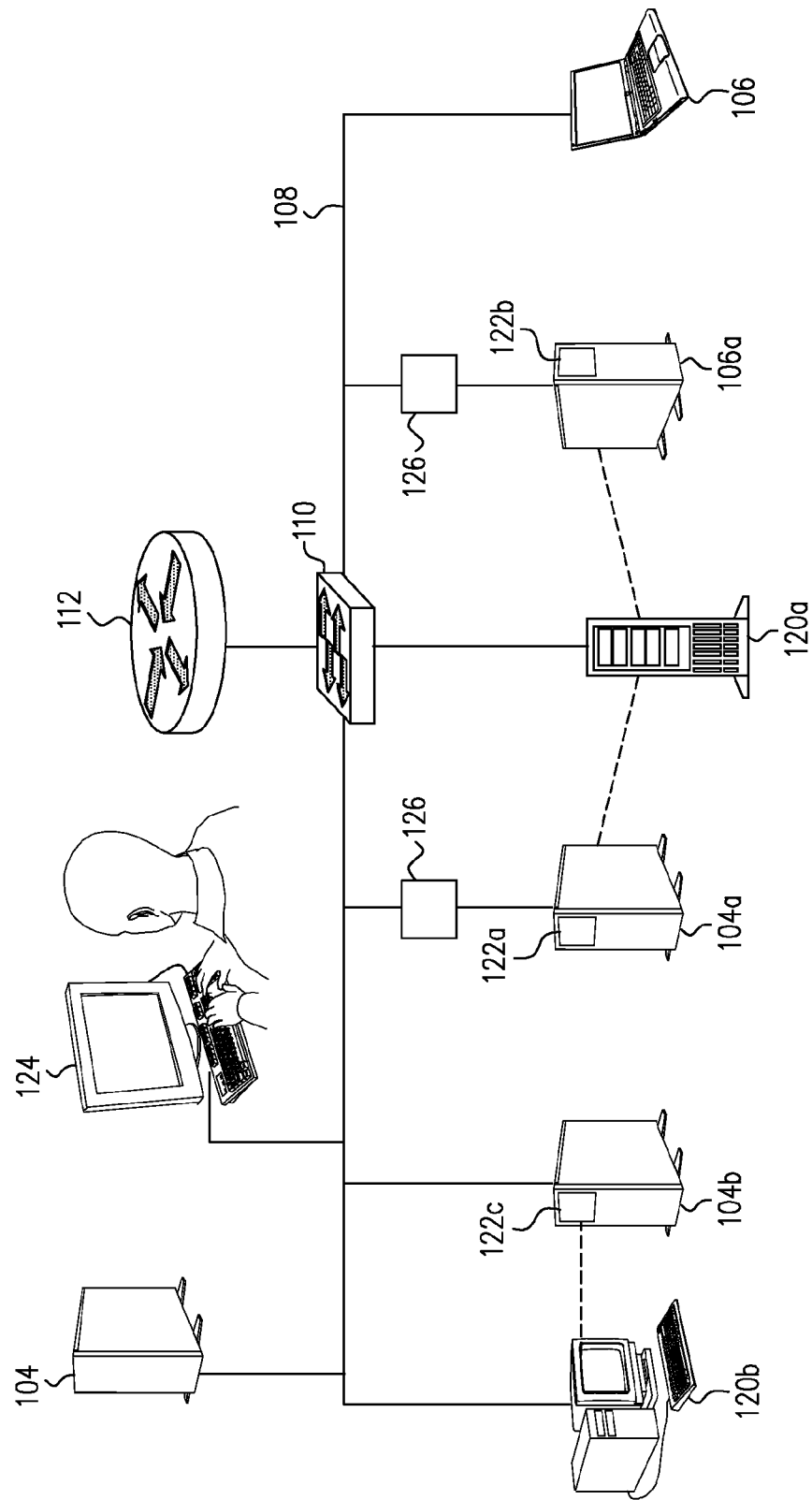
FIG. 1 is a simplified graphic representation of an embodiment of a network for identifying the presence of and/or for trapping advanced persistent threats in accordance with an embodiment of the teachings herein.

The invention, in some embodiments, relates to the field of computer threats, and more specifically to methods and systems for identifying the presence of advanced persistent threats in a network and for trapping the threats.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

In general, it is known that malware that has infected an endpoint node in an organization seeks to retrieve valuable information, or use the endpoint node as a better access points to other resources in the organization. For example, the infected endpoint node may be a user endpoints or one of various kinds of servers storing valuable information. As another example, the infecting malware uses data and credentials found on the infected endpoint, as a lead to valuable resources, such as other endpoint nodes, which the malware wishes to access. The data may include names of other resources, IP addresses, credentials, different kind of keys, and various other information the malware can use in order to access relevant important information it is trying to retrieve from the organization.

In accordance with the present invention, mini-traps are planted on the endpoint nodes, servers, or any other asset in the organization, which traps direct malware to access specific decoy resources in the organization's network. In other words, when malware tries to obtain "information" that will allow it access to resources in the organization, and instead lure the malware to obtain faked credentials leading to a decoy component of the network. The various components of the technology herein are described in further detail hereinbelow.

Reference is now made to FIG. 1, which is a simplified graphic representation of an embodiment of a network 100 for identifying the presence of and/or for trapping advanced persistent threats in accordance with an embodiment of the teachings herein.

As seen in FIG. 1, a network 100, forming part of an organization such as an office, a bank, or the like, is structured as most typical organizational networks and includes one or more resources, including servers 104 and endpoint nodes 106 interconnected by one or more Local Area Networks (LANs) 108, which also include one or more switches 110 directing traffic within the LAN 108, and one or more routers 112 directing traffic between elements of the LAN 108 and an external network, such as the Internet or any other Wide Area Network (WAN), as well as between switches 110 of different LANs 108.

In addition to the resources 104 and 106, the network 100 also includes one or more decoy endpoints, servers and network devices 120, which may be decoy servers or decoy user computers. The decoy may be a physical decoy, such as a dedicated server, or a virtual decoy.

In accordance with an embodiment of the teachings herein, one or more mini-traps 122 are set in one or more of the resources 104 and 106, and lure the malware to one or more decoy endpoints 120. In other words, when malware tries to obtain "information" (faked credentials) that will allow it easy access to resources in the organization, the mini-trap provides misleading information that will direct the malware to a decoy endpoint and/or decoy server. Each mini-trap 122 is associated with a specific decoy endpoint 120, though multiple mini-traps 122 may be associated with the same decoy endpoint. For example, in the illustrated embodiment, mini-traps 122a and 122b located in respective resources 104a and 106b are associated with decoy server 120a, whereas mini-trap 122c located in server 104b is associated with a decoy user computer 120b.

For example, a mini-trap 122 located in a specific endpoint node 106 comprises an IP address of a decoy FTP server 120, as well as the credentials for accessing this decoy FTP server. The malware running on the endpoint node finds the mini-trap 122 and attempts to access the FTP server using the IP address and credentials of the mini-trap, leading the malware to the decoy FTP server. The decoy FTP server and mini-trap must be fully correlated with one another, so that the mini-trap provides the appropriate IP address or host name for actually directing the malware to the decoy server. The contents, or values associated with the mini-traps may also be used to identify the infected endpoint. For example, each mini-trap loaded onto the network resources may have a different value associated therewith, which value will uniquely identify the mini-trap being used, and consequently the infected endpoint.

Other types of mini-traps may include, for example, information relating to accessing endpoint nodes using remote desktop protocols (RDP), information relating to accessing endpoint nodes using a virtual network connection (VNC), and information for accessing an internal HTTP server requiring login. In such embodiments, the mini-trap can be placed on the endpoint node in browser settings, relevant configuration files, an operating system registry, or the like. Mini-traps can also include, or consist of, faked credential for accessing network device decoys like firewalls, routers and WIFI devices.

A manager node 124 is connected to, or forms part of, the network, and is configured to control the setting of mini-traps 122 within resources 104 and 106, and to manage the synchronization between the mini-traps and the decoy endpoints 120, as explained hereinbelow. Manager node 124 is also configured to function as an interface with a user, such as an IT manager or security officer, for configuring the network and in particular for setting up mini-traps 122, for ensuring the correlation between mini-traps 122 and decoy endpoints 120, and for gathering information from the decoy endpoints 120. For example, the user may access manager node 124 in order to see which mini-traps 122 in network 100 have been accessed by malware in order to access the relevant decoy system, or to update the decoy resource 120 to which a specific mini-trap 122 directs the malware.

It is a particular feature of the teachings herein that the resources 104 and 106 and the decoy endpoints 120 may be located in the same branch of the organization, but may also be distributed in different LANs of the organization and/or in various dispersed geographic locations. For example, a branch of the organization located in California, may have a mini-trap 122 directing malware to a decoy endpoint 120 at the company headquarters in New York. The mini-traps 122 may also direct the malware to a decoy located on an external network, such as the Internet, like an FTP server with a public IP address or a web server with a public IP address and host name.

It is appreciated that the manager node 124 is configured to ensure that there is perfect association and/or correlation between each mini-trap and the decoy associated therewith in order for the trap to work properly, and to allow detection of malware that has been directed to the decoy with 100% certainty.

It is further appreciated that mini-traps 122 can be planted in resources 104 and/or 106 in many different ways. The specific kind of mini-trap suitable to be planted in each resource in the network is determined based on characteristics of the resource, and an authorized mechanism, controlled by manager node 124 or forming part of manager node 124, then plants the determined type of mini-trap in the resource.

It is appreciated that a security administrator of a network may add mini-traps that are relevant and specific to applications that are specific to the organization and/or the network, or that were developed by the organization.

Any suitable method for planting the mini-traps 122 may be employed in accordance with the teachings herein. In some cases, the mini-traps 122 may be planted in the resources 104 and/or 106 using the Active Directory GPO tools. In some cases, the mini-traps 122 are planted by using administrator credentials and authorizations, and directly accessing the resources 104 and/or 106 to plant the mini-traps thereon. In some cases the mini-traps 122 may be planted by having agents that run on the resources 104 and/or 106 and plant the mini-traps thereon.

It is appreciated that since the mini-traps need to be accessed by infecting malware in order to direct the malware to the decoy and trap the malware, knowledge of the purpose of the malware enables set-up of relevant decoys and planting suitable mini-traps, and improves the probability that the malware will be caught.

In some embodiments, one or more network traffic sniffers 126 are functionally associated with the mini-traps, and search for the mini-traps or the mini-traps trails in the traffic stream. The sniffers 126 sniff the traffic from the resources in which the mini-traps 122 are planted, and specifically sniff for usage of the mini-traps 122, in order to aid in identifying infecting malware. The sniffers 126 may identify whether an endpoint node 106 is trying to use the information included in a mini-trap 122. Such use of the mini-trap can indicate the presence of malware, even if the malware does not actually access the decoy resource associated with the mini-trap, or if the decoy resource is not properly synchronized with the mini-trap.

As mentioned hereinabove, in order for the mini-trap—decoy system to function correctly, each active decoy endpoint 120 must be synchronized with at least one corresponding mini-trap 122. Since the IP addresses of the decoy endpoints 120 and/or the services provided by the decoys may periodically change, such synchronization must be maintained, and periodically updated, for example by manager node 124. Various methods for constant synchronization between the active decoy endpoints 120 and the set of active mini-traps 122 located in the resources 104 and/or 106 are considered to be within the scope of the present invention. In some cases the manager node 124 sends suitable commands to some decoy endpoints 120 to shut down and to other decoy resources to become active. In some such cases, the manager node 124 also reviews the list of currently active mini-traps 122 and makes suitable changes thereto in order to match the mini-traps 122 to the active decoy endpoints 120.

It is noted that decoy endpoints 120 may be added when a new network is found or is associated with network 100, or when a new service is found, at which point the manager node 124 synchronizes the information relating to the new network or services and adds or removes one or more corresponding mini-traps 122.

It is appreciated that in some embodiments, two or more decoy endpoints 120 may communicate with one another, over the network. The decoy endpoints 120 may transmit to one another valuable data, such as business plans, credit cards numbers, social security numbers, and the like, so as to lure in malware seeking such information. This type of communication is particularly useful when the attacking malware is able to sniff traffic within the network, and would become aware of such communication between decoy endpoints 120. In some embodiments, in order to protect users while trapping the infecting malware, the data transmitted between decoy endpoints is false data, which would not provide any advantage to the malware.

In other embodiments, one may install an agent on several endpoints in the network 100, such that the network communicates with one or more of the decoy endpoints 120, thus luring malware that sniffs traffic within the network as described hereinabove. It is appreciated that the agent would need to be synchronized, or correlated, with the decoy endpoints, similarly to the mini-traps, as well as with the manager node 124, so as to know which decoy endpoints 120 are active in the network and what kind of data to communicate to each decoy endpoint 120.

Figure 2:
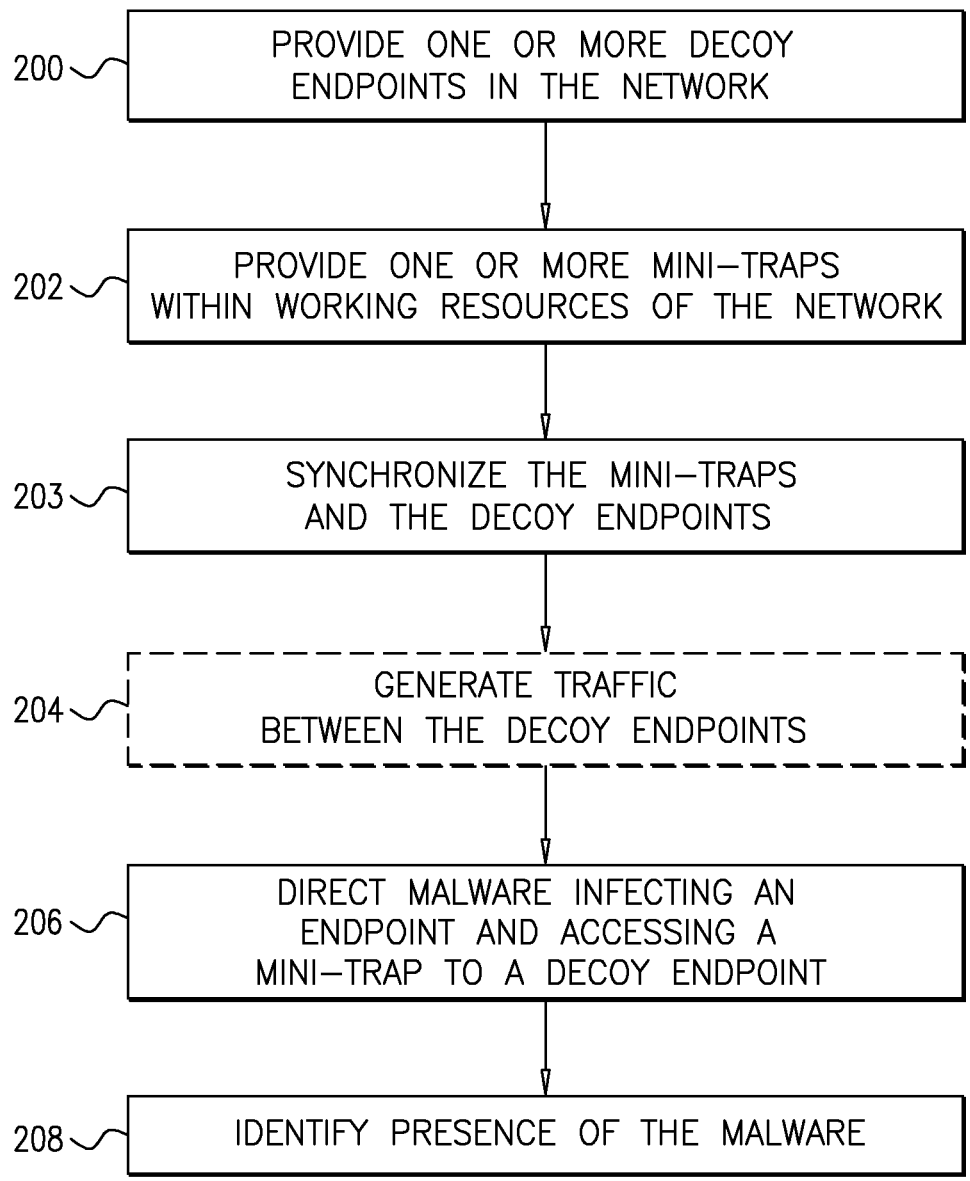
FIG. 2 is a flow chart of an embodiment of a method for identifying the presence of and/or trapping advanced persistent threats in accordance with an embodiment of the teachings herein.

The functionality and use of the system described hereinabove with respect to FIG. 1 is now explained with reference to FIG. 2, which is a flow chart of an embodiment of a method for identifying the presence of and/or trapping advanced persistent threats in accordance with an embodiment of the teachings herein.

As seen at step 200, one or more decoy endpoints as described hereinabove are provided within the network. A plurality of mini-traps, each directing to one or more of the decoy endpoints, are provided within working endpoints and/or resources of the network at step 202. The mini-traps and decoy endpoints/servers are synchronized at step 203, which may occur periodically also after creation of the network. In optional step 204, traffic is generated between the decoy endpoints and/or between one or more endpoints.

At step 206, malware infecting a working endpoint or resource including a mini-trap is directed by the mini-trap to a decoy endpoint, or is lured by traffic generated at step 204 to a decoy endpoint. At this stage, presence of malware on the endpoint is known, as seen at step 208.

In the context of the present application and claims, the term "node" or "endpoint" relates to any machine forming part of a network, including, inter alia, end user computers, servers, proxies, ports, printers, scanners, fax machines, copiers, imaging machines such as X-ray machines and MRI machines, and in general to any machine using a CPU and an operating system which is connected to an organization's network.

In the context of the present application and claims, the term "resource" relates to any file or component of the network which can be accessed using a URI and with which a node can communicate, including, inter alia, web pages, images, documents, sound files, multimedia files, executable files, scripts, applets, and programs.

In the context of the present application and claims, the terms "malware" and "advanced persistent threat" may be used interchangeably, and relate to any type of software which can enter a node or a network, remain in the node or network, and collect information about the node or network and/or make changes to or manipulate the node or network. Malware may be permitted by the user to enter the node or network, typically without the user knowing that the software he allowed into the node or network is malicious, or may enter the node or network without the user knowing about it. Malware may include, inter alia, viruses, worms, Trojan horses, adware, spyware, bots, bugs, and rootkits. Malware may operate independently, or may be operated and controlled remotely by a hacker that constantly communicates with the malware using different mechanisms such as web traffic, USB devices, and the like.

In the context of the present application and claims, the term "command and control" relates to a resource that communicates with malware already in a node or a network, and instructs the malware what actions to take or what data to collect, and/or receives data that the malware has been able to gather and has sent out of the organization.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A system for identifying the presence of advanced persistent threats on a network, comprising:
   a plurality of resources, interconnected to form a network;
   at least one decoy resource forming part of said network, at least one of said at least one decoy resource comprising a virtual decoy resource;
   at least one mini-trap installed on at least one of said plurality of resources and functionally associated with at least one of said at least one decoy resource, said at least one mini-trap comprising deceptive information directing malware accessing said at least one mini-trap to said decoy resource associated therewith, such that said malware proceeds from said at least one mini-trap to said decoy resource associated therewith; and
   a manager node forming part of said network and configured to manage placement of said at least one mini-trap on said at least one of said plurality of resources and association between said at least one mini-trap and said decoy resource associated therewith
   wherein each of said at least one mini-trap is associated with a unique value, such that when infecting malware accesses one of said at least one mini-trap located on a specific one of said plurality of resources, the mini-trap being accessed is uniquely identified, thereby uniquely identifying the specific resource as being infected.

2. The system of claim 1, wherein said deceptive information comprises faked credentials.

3. The system of claim 1, wherein said at least one mini-trap comprises a plurality of mini traps, said at least one decoy resource comprises a plurality of decoy resources, and wherein at least two of said plurality of mini-traps are associated with different ones of said plurality of decoy resources.

4. The system of claim 1, wherein said at least one mini-trap comprises a plurality of mini traps, and wherein at least two of said plurality of mini-traps are associated with the same one of said at least one decoy resource.

5. The system of claim 1, wherein said manager node comprises a user interface, allowing a user to configure said network, set up one or more of said at least one mini-trap and of said at least one decoy resource, and gather information from said at least one decoy resource.

6. The system of claim 1, wherein said network comprises at least two Local Area Networks (LANs), said at least one mini-trap is installed on a resource in a first of said at least two LANs, and said at least one decoy resource associated with said at least one mini-trap is on a second of said at least two LANs.

7. The system of claim 6, wherein said at least two LANs are geographically distributed.

8. The system of claim 1, further comprising at least one traffic sniffer functionally associated with said at least one mini-trap, configured to sniff use of said at least one mini-trap and thereby to indicate the presence of infecting malware.

9. A method for identifying the presence of advanced persistent threats on a network including a plurality of resources, the method comprising:
   providing at least one decoy resource forming part of the network, at least one of said at least one decoy resource comprising a virtual decoy resource;
   installing at least one mini-trap on at least one of said plurality of resources, said at least one mini-trap being functionally associated with at least one of said at least one decoy resource, said at least one mini-trap comprising deceptive information directing malware accessing said at least one mini-trap to said at least one decoy resource associated therewith, such that said malware proceeds from said at least one mini-trap to said decoy resource associated therewith;
   associating each of said at least one mini-trap with a unique value, such that when infecting malware accesses one of said at least one mini-trap located on a specific one of said plurality of resources, the mini-trap being accessed is uniquely identified, thereby uniquely identifying the specific resource as being infected;
   detecting use of said at least one mini-trap by infecting malware by detecting said unique value associated with said at least one mini-trap, thereby to identify the presence of malware on said at least one of said plurality of resources where said at least one mini-trap is installed; and
   managing placement of said at least one mini-trap on said at least one of said plurality of resources and association between said at least one mini-trap and said decoy resources associated therewith.

10. The method of claim 9, wherein said detecting comprises sniffing use of said at least one mini-trap in traffic in said network.

11. The method of claim 9, wherein said installing comprises at least one of the following:
    planting said at least one mini-trap on said one of said plurality of resources using Active Directory GPO tools;
    planting said at least one mini-trap on said one of said plurality of resources using administrator credentials and authorizations;
    directly accessing said one of said plurality of resources to plant said at least one mini-trap thereon; and
    running agents on said plurality of resources for planting said at least one mini-trap thereon.

12. The method of claim 9, further comprising periodically updating said functional association between said at least one mini-trap and said at least one decoy resource.

* * * * *